US011170238B2

(12) United States Patent
Gao et al.

(10) Patent No.: US 11,170,238 B2
(45) Date of Patent: Nov. 9, 2021

(54) APPROACHES FOR DETERMINING TRAFFIC LIGHT STATE

(71) Applicant: Woven Planet North America, Inc., Los Altos, CA (US)

(72) Inventors: Meng Gao, San Francisco, CA (US); Ashesh Jain, San Francisco, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 0 days.

(21) Appl. No.: 16/453,840

(22) Filed: Jun. 26, 2019

(65) Prior Publication Data

US 2020/0410263 A1    Dec. 31, 2020

(51) Int. Cl.
*G06K 9/00* (2006.01)
*B60W 50/00* (2006.01)
*G05D 1/02* (2020.01)

(52) U.S. Cl.
CPC ..... *G06K 9/00825* (2013.01); *B60W 50/0097* (2013.01); *G06K 9/00798* (2013.01); *G06K 9/00805* (2013.01); *B60W 2420/42* (2013.01); *B60W 2555/60* (2020.02); *G05D 1/021* (2013.01)

(58) Field of Classification Search
CPC ..................... G06K 9/00825; G06K 9/00805
See application file for complete search history.

(56) References Cited

U.S. PATENT DOCUMENTS

| | | | |
|---|---|---|---|
| 2015/0106010 A1* | 4/2015 | Martin | G08G 1/0129 701/410 |
| 2016/0214607 A1* | 7/2016 | Dolgov | G01S 13/867 |
| 2017/0262709 A1* | 9/2017 | Wellington | G06K 9/6201 |
| 2019/0259282 A1* | 8/2019 | Ji | G08G 1/096783 |

* cited by examiner

*Primary Examiner* — Girumsew Wendmagegn
(74) *Attorney, Agent, or Firm* — Christopher G. Darrow; Darrow Mustafa PC

(57) ABSTRACT

Systems, methods, and non-transitory computer-readable media can determine sensor data captured by at least one sensor of a vehicle over a set of time intervals while navigating an environment. Three-dimensional data describing the environment over the set of time intervals can be determined from the captured sensor data. The three-dimensional data capturing a traffic motion pattern for at least one direction of travel. Image data of at least one traffic light in the environment can be determined over the set of time intervals from the captured sensor data. A state of the at least one traffic light can be predicted based at least in part on the three-dimensional data describing the environment and the image data of at least one traffic light in the environment over the set of time intervals.

21 Claims, 14 Drawing Sheets

500

Determine sensor data captured by at least one sensor of a vehicle over a set of time intervals while navigating an environment
502

Determine three-dimensional data describing the environment over the set of time intervals from the captured sensor data, the three-dimensional data capturing a traffic motion pattern for at least one direction of travel
504

Determine image data of at least one traffic light in the environment over the set of time intervals from the captured sensor data
506

Predict a state of the at least one traffic light based at least in part on the three-dimensional data describing the environment and the image data of at least one traffic light in the environment over the set of time intervals
508

FIGURE 5

APPROACHES FOR DETERMINING TRAFFIC LIGHT STATE

FIELD OF THE INVENTION

The present technology relates to the field of vehicles. More particularly, the present technology relates to systems, apparatus, and methods for determining traffic light state.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine sensor data captured by at least one sensor of a vehicle over a set of time intervals while navigating an environment. Three-dimensional data describing the environment over the set of time intervals can be determined from the captured sensor data. The three-dimensional data capturing a traffic motion pattern for at least one direction of travel. Image data of at least one traffic light in the environment can be determined over the set of time intervals from the captured sensor data. A state of the at least one traffic light can be predicted based at least in part on the three-dimensional data describing the environment and the image data of at least one traffic light in the environment over the set of time intervals.

In an embodiment, the prediction for the state of the at least one traffic light is further based on a semantic map of the environment.

In an embodiment, the semantic map encodes locations of a particular type of road feature detected within the environment.

In an embodiment, the semantic map identifies locations of traffic lights, locations of lanes and directions of travel, or locations of cross-walks and directions of travel.

In an embodiment, the three-dimensional data is derived from point clouds captured by at least one of a LiDAR system in the vehicle over the set of time intervals, radar data captured by a radar system in the vehicle over the set of time intervals, image data captured by a camera system in the vehicle, or a combination thereof.

In an embodiment, the three-dimensional data is associated with encoded information including locations of a particular type of agent detected within the environment.

In an embodiment, the encoded information includes locations of vehicles detected within the environment and locations of pedestrians detected within the environment.

In an embodiment, the image data of the at least one traffic light is captured by one or more optical cameras associated with the vehicle.

In an embodiment, predicting the state of the at least one traffic light further comprises: providing an instruction to the vehicle, wherein the instruction causes the vehicle to stop driving or proceed driving.

In an embodiment, the prediction for the state of the at least one traffic light is further based in part on a state prediction determined for the at least one traffic light based on an image processing technique that predicts the state for the at least one traffic light based on a color perceived in association with the at least one traffic light in at least one image.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present technology.

Figure 1A:
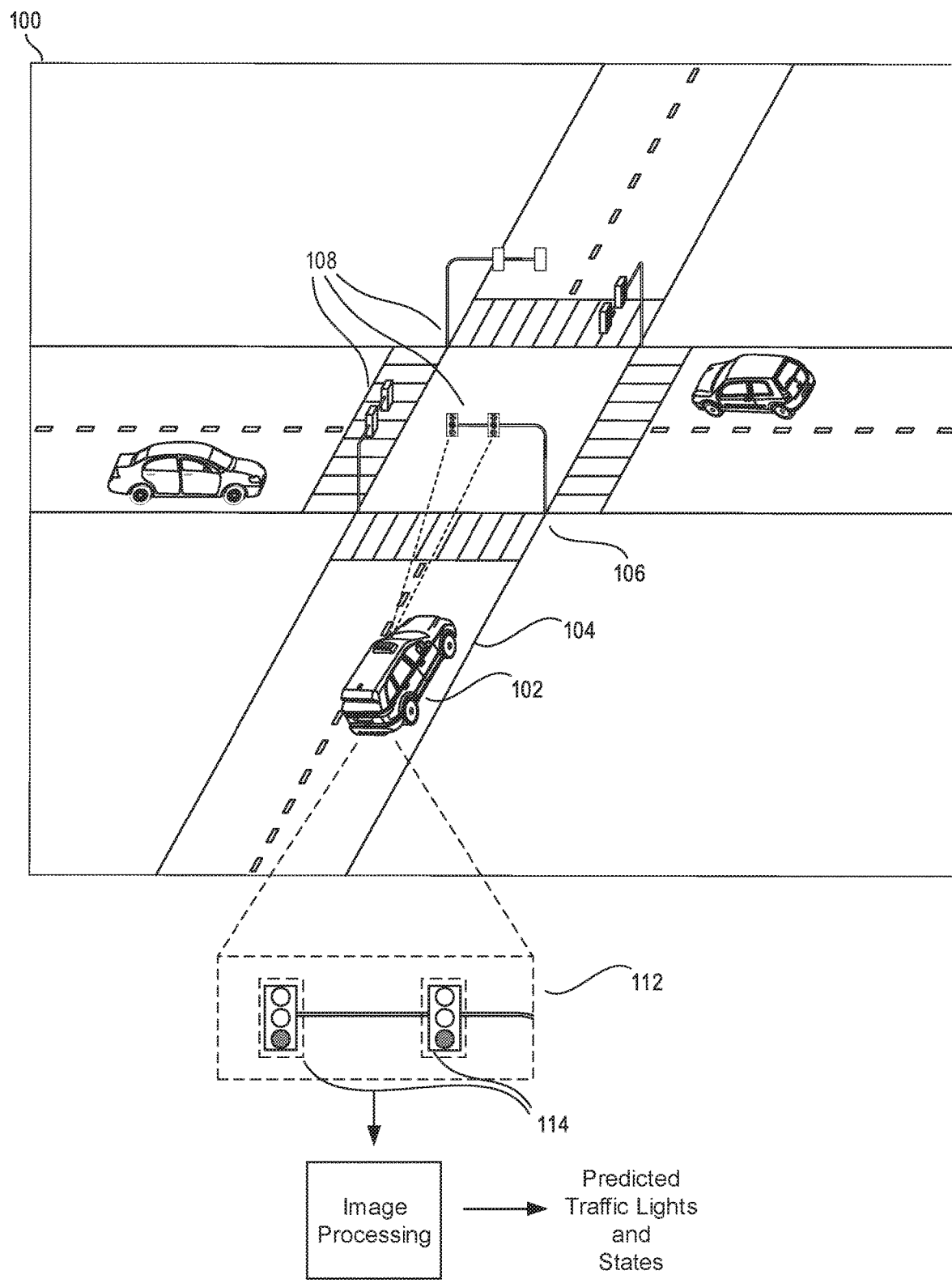
FIGS. 1A-1D illustrate challenges that may be experienced by a vehicle when determining traffic light states, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Figure 1B:
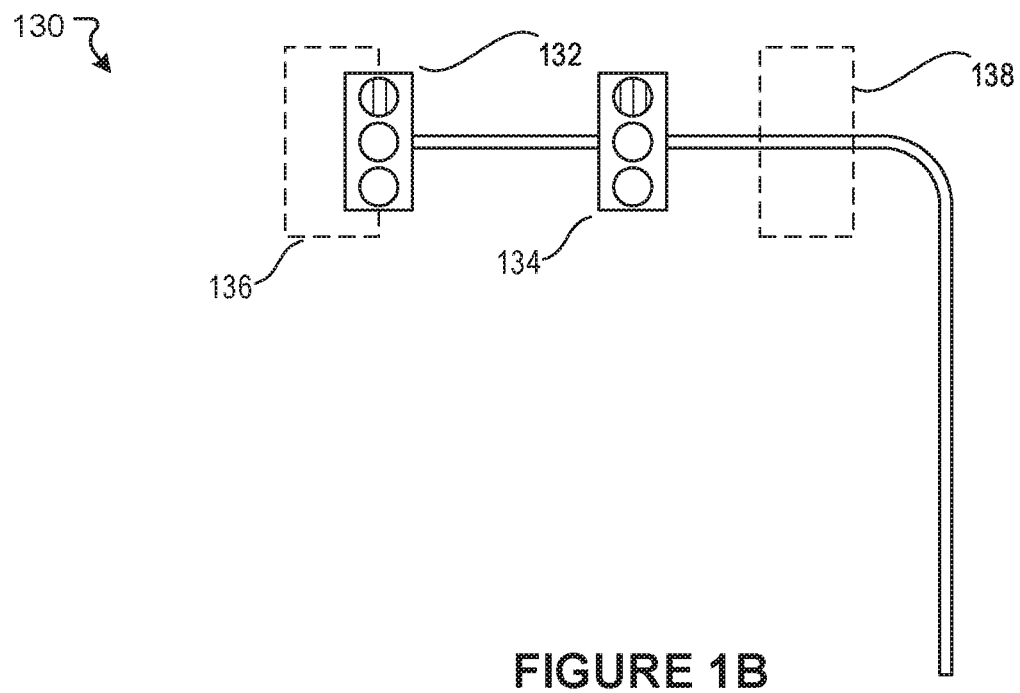
Figure 1C:
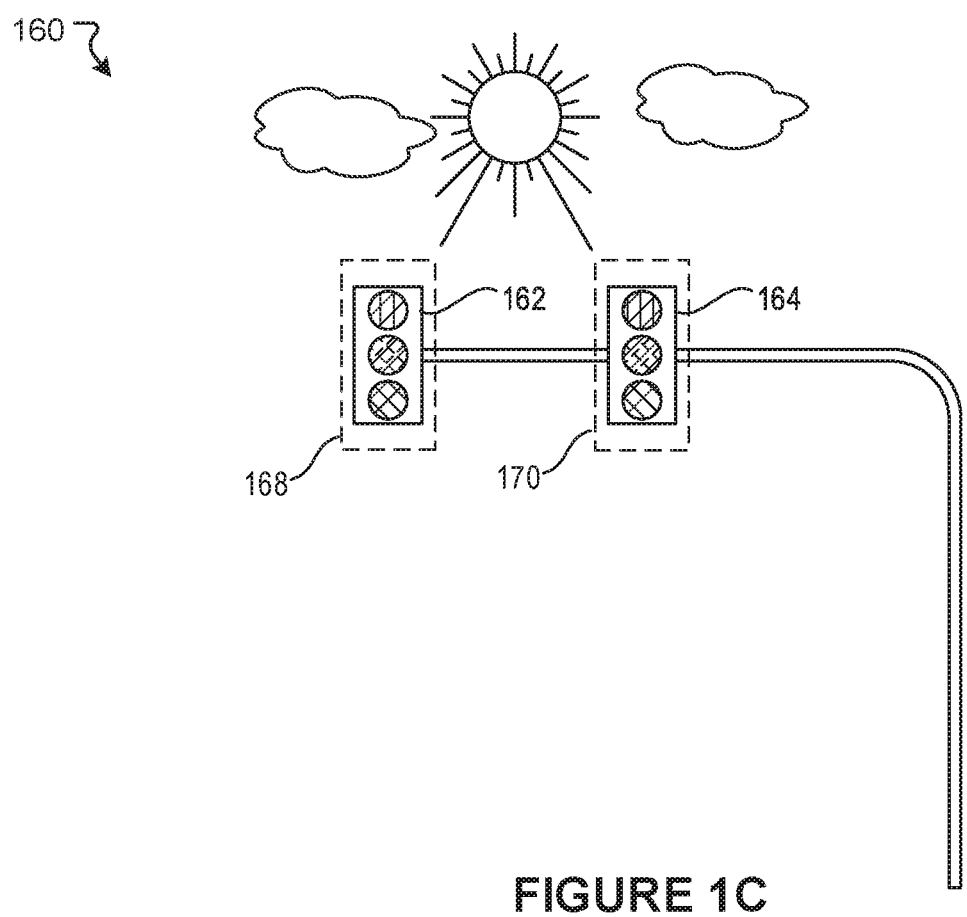
Figure 1D:
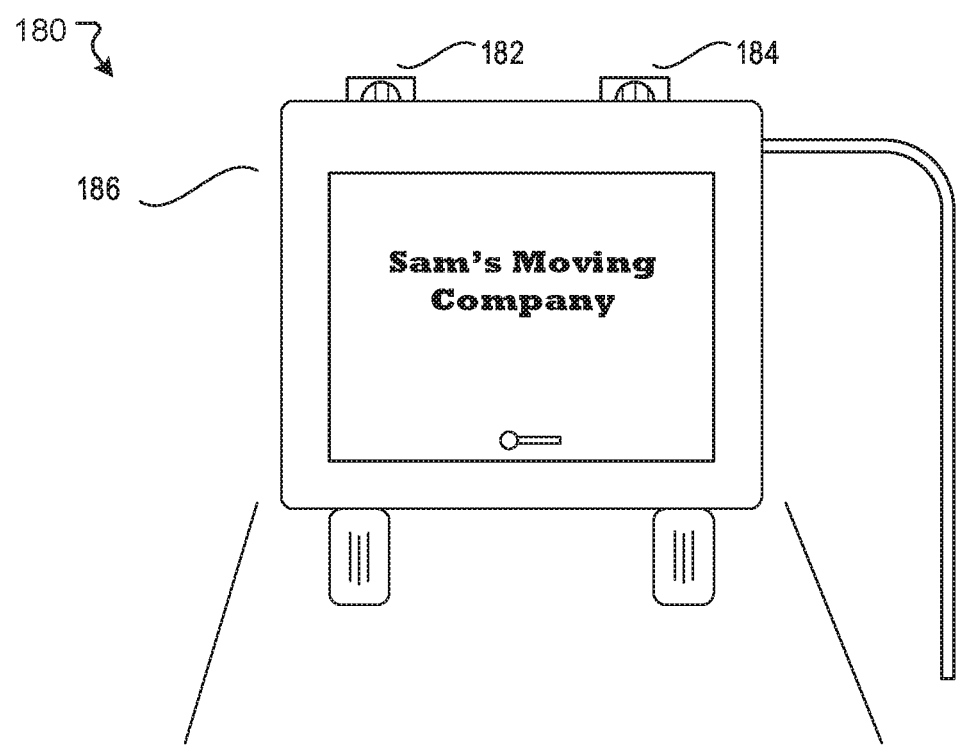

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. For example, a vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards. In some instances, such vehicles may be used by a transportation management system to provide ride services or other types of services. A transportation management system may comprise a fleet of such vehicles. Each vehicle in the fleet may include one or more sensors in a sensor suite. In general, a vehicle can traverse a geographic location or region using a number of different routes. Each route can be made up of one or more road segments. Further, each road segment can be associated with a number of traffic lights that govern vehicle traffic. Moreover, there can be many types of traffic lights with each type being configured to govern a specific type of vehicle traffic. For instance, a given intersection may include a three-stage traffic light that informs drivers to stop (e.g., a red light), go (e.g., a green light), or proceed cautiously (e.g., a yellow light). That same intersection may also include a left-turn lane with a protected left-turn traffic light. Vehicles must typically be able to recognize and distinguish between different types of traffic lights and their respective states to help ensure safe navigation. For example, a vehicle must typically be able to recognize a three-stage traffic light, determine which lanes are governed by the three-stage traffic light, and also determine a state of the three-stage traffic light in real-time (or near real-time). Under conventional approaches, a vehicle can be equipped with one or more cameras that capture visual data of traffic lights that are encountered by the vehicle while driving on a road segment. For example, the cameras can capture images of traffic lights at some frequency (e.g., 5 Hz, 10 Hz, etc.). These images can be evaluated to identify traffic lights, their respective types, which lanes of the road segment are governed by the traffic lights, and their respective states (e.g., a red, yellow, or green light; an active or inactive protected left-turn signal; etc.). These existing approaches are prone to many different errors. For example, as mentioned, existing approaches often use image processing techniques to recognize traffic lights and their states. However, relying on image processing alone may not be enough to reliability recognize traffic lights and their states. For example, a field of view or calibration setting for the cameras from which the images were captured may be sub-optimal, thereby resulting in poor quality images that inaccurately represent traffic lights. Even if these camera settings are configured as intended, the cameras may still capture poor quality images due to an accumulation of dirt and debris on camera lenses, foggy or misty weather conditions, or glare from the sun, to name some examples. For example, FIG. 1A illustrates an example environment 100 in which a vehicle 102 is shown navigating a road 104 while approaching an intersection 106. The intersection 106 includes a number of traffic lights 108 that govern different roads of the intersection 106. In general, the vehicle 102 may be equipped with one or more sensors that can be used to capture environmental information, such as information describing a given road and objects present on or along the road 104. For example, in some instances, the vehicle 102 may be equipped with one or more sensors in a sensor suite including optical cameras, LiDAR, radar, infrared cameras, and ultrasound equipment, to name some examples. Such sensors can be used to collect information that can be used by the vehicle 102 to understand its environment and objects within the environment. To effectively navigate the road 104, the vehicle 102 typically needs to be aware of the traffic lights 108 associated with the intersection 106. The vehicle 102 also typically needs to distinguish between different lanes of the intersection 106 and which traffic lights 108 govern those lanes. Further, the vehicle 102 typically needs to determine respective states associated with some or all of the traffic lights 108 in real-time (or near real-time). Under conventional approaches, the vehicle 102 would capture visual data 112 (e.g., images, video) from which locations of one or more traffic lights 114 would be predicted. For example, image processing can be applied to analyze the visual data 112 to predict locations of the traffic lights 114 using bounding boxes. Further, a pre-computed map of the environment 100 can be accessed to confirm the predicted locations of the traffic lights 114. For example, the pre-computed map can be determined in advance and may label pre-determined locations of traffic lights that are present in the environment 100. The pre-computed map can also identify associations between lanes in the environment 100 and traffic lights that govern those lanes. Based on the pre-computed map, the pre-determined locations of the traffic lights 114 can be projected in relation to the visual data 112 to confirm the predicted locations of the traffic lights 114. With their locations confirmed, image processing can also be applied to determine (or predict) respective states of the traffic lights 114 (e.g., red light, yellow light, green light, left arrow, etc.). As mentioned, such existing approaches can be error-prone and thus may not provide a sufficient level of reliability with respect to detecting traffic light states. For instance, faulty cameras associated with the vehicle 102 may capture visual data that inaccurately represents traffic lights 132, 134 in a real-world environment 130, as illustrated in the example of FIG. 1B. Such inaccurate visual data can result in the vehicle 102 erroneously predicting traffic light locations 136, 138 that are inconsistent with their actual locations 132, 134. Existing approaches can also be unreliable due to external factors, such as weather conditions. For example, FIG. 1C illustrates an example environment 160 which includes traffic lights 162, 164. In this example, the vehicle 102 has accurately predicted locations 168, 170 of the traffic lights 162, 164 from captured visual data. However, despite being able to correctly identify locations of the traffic lights, the vehicle 102 may still have difficulty determining traffic light states due to color distortions that may result from weather conditions, such as glare from the sun. For instance, a green light may look red based on the glare from the sun. In another example, FIG. 1D illustrates an example environment 180 which includes traffic lights 182, 184. In this example, the vehicle 102 is unable to detect the traffic lights 182, 184 and their respective states due to an obstruction 186, such as a truck driving in front of the vehicle 102. Accordingly, other robust approaches are needed to more accurately and reliably determine traffic light states.

An improved approach in accordance with the present technology overcomes the foregoing and other disadvantages associated with conventional approaches. The improved approach can overcome these issues by interpreting traffic light states based on observed traffic patterns. For example, in various embodiments, a neural network can be trained to learn associations between traffic motion patterns and traffic light states. For example, a traffic motion pattern can indicate when agents (e.g., vehicles, bicyclists, pedestrians, etc.) in a given lane are in motion and their respective amount of motion in relation to one another. The traffic motion pattern can correspond to a particular lane or lanes that are associated with a given direction of travel. For example, when stopped at a four-way intersection, a vehicle can determine when agents in the vehicle's direction of travel are in motion and when agents in one or more intersecting lanes are in motion. Such traffic motion patterns can be used to train the neural network to learn associations between traffic motion patterns and traffic light states. Based on this learning, the neural network can be trained to predict whether a vehicle approaching or stopped at a traffic light can proceed to drive. For example, if traffic is stopped in a vehicle's direction of travel but moving in a perpendicular direction of travel, then the neural network can output a "stop" instruction that tells the vehicle to remain stopped, since the traffic motion pattern indicates the traffic light governing the vehicle is in a stop state (e.g., a red light state). In another example, if traffic is moving in a vehicle's direction of travel but stopped in a perpendicular direction of travel, then the neural network can output a "go" instruction that tells the vehicle to proceed, since the traffic motion pattern indicates the traffic light governing the vehicle is in a go state (e.g., a green light state). The neural network can be trained based on a number of training examples. In some embodiments, a training example can include a set of inputs, such as an encoded semantic map of an environment that includes one or more traffic lights, three-dimensional data of the environment (e.g., point clouds captured by LiDAR systems, radar data captured by radar systems, etc.), and two-dimensional image data capturing the one or more traffic lights. The training example can also include a supervisory signal which identifies one or more labels associated with the training example. For example, a training example can be associated with a label that corresponds to a traffic light state. In another example, a training example can be associated with a label that corresponds to a "stop" or "go" instruction. Once trained, the neural network can evaluate a set of inputs and can output predictions for traffic light states. In some embodiments, the neural network can be used in combination with other techniques (e.g., image processing techniques, deep learning techniques, etc.) that make such predictions based on images alone to further improve traffic light and state detection. More details relating to the present technology are provided below.

Figure 2:
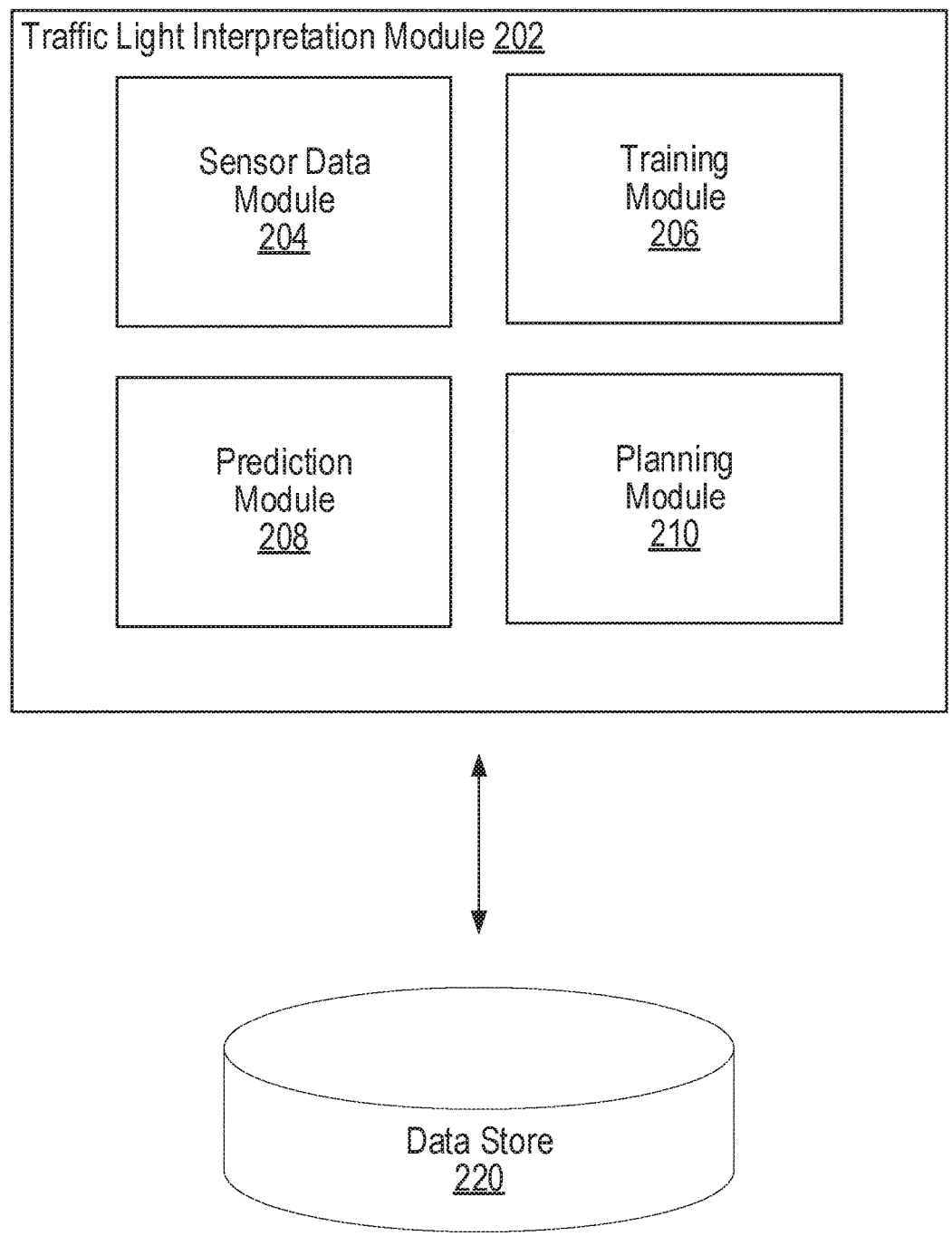
FIG. 2 illustrates an example traffic light interpretation module, according to an embodiment of the present technology.

FIG. 2 illustrates an example system 200 including an example traffic light interpretation module 202, according to an embodiment of the present technology. As shown in the example of FIG. 2, the traffic light interpretation module 202 can include a sensor data module 204, a training module 206, a prediction module 208, and a planning module 210. In some instances, the example system 200 can include at least one data store 220. The traffic light interpretation module 202 can be configured to communicate and operate with the at least one data store 220. The at least one data store 220 can be configured to store and maintain various types of data. In some embodiments, some or all of the functionality performed by the traffic light interpretation module 202 and its sub-modules may be performed by one or more backend computing systems, such as a transportation management system 660 of FIG. 6. In some embodiments, some or all of the functionality performed by the traffic light interpretation module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The sensor data module 204 can be configured to access sensor data captured by vehicles. For example, the sensor data may include data captured by one or more sensors including optical cameras, LiDAR, radar, infrared cameras, and ultrasound equipment, to name some examples. The sensor data module 204 can obtain such sensor data, for example, from the data store 220 or directly from sensors associated with a vehicle in real-time (or near real-time). In some instances, the obtained sensor data may have been collected by a fleet of vehicles that offer ridesharing services including autonomous and semi-autonomous vehicles. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

Figure 3A:
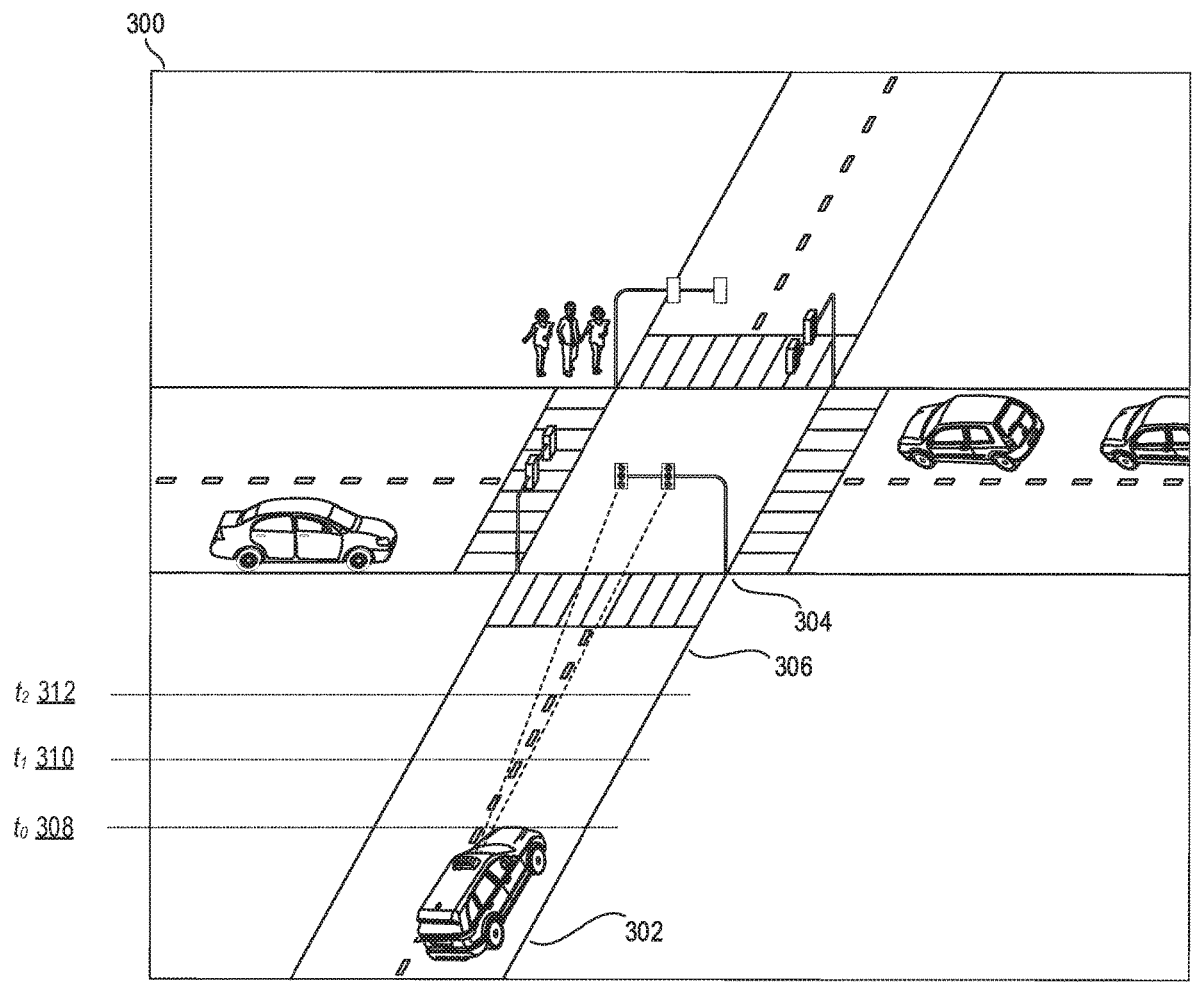
FIGS. 3A-3F illustrate example diagrams of data for training a model to interpret traffic light states, according to an embodiment of the present technology.

The training module 206 can be configured to train a model (e.g., machine learning model, deep neural network, etc.) to predict traffic light states based on observed changes to traffic motion patterns over time. For example, the model can be trained using various training examples that can be generated from data collected by a fleet of vehicles that offer ridesharing and transportation services. In some embodiments, a training example can include data captured by a vehicle over some period of time. In such embodiments, the training example can include sub-examples of data captured by the vehicle at various time intervals during the period of time. For example, the training example can include data captured by a vehicle 302 over some period of time as the vehicle approaches one or more traffic lights 304 while navigating an environment 300, as illustrated in FIG. 3A. In this example, the vehicle 302 can capture various data describing the environment 300 while driving on a road 306. The data can be captured by the vehicle 302 over the period of time at pre-defined time intervals, such as at time $t_0$ 308, time $t_1$ 310, and time $t_2$ 312. In various embodiments, such data can be used to train the model to predict traffic light states based on observed changes to traffic motion patterns over time. In some embodiments, the captured data can include two-dimensional images of the traffic lights 304 captured by optical cameras of the vehicle 302 at the pre-defined time intervals $t_0$ 308, time $t_1$ 310, and time $t_2$ 312. In some embodiments, the captured data can include three-dimensional data of the environment 300 captured by the vehicle 302 at the pre-defined time intervals $t_0$ 308, time $t_1$ 310, and time $t_2$ 312. For example, the three-dimensional data can be derived from point clouds captured by a LiDAR system in the vehicle 302 at the pre-defined time intervals.

The three-dimensional data can also be derived from other types of sensor data collected by the vehicle 302, such as radar data captured by a radar system in the vehicle 302. The data captured at the pre-defined time intervals $t_0$ 308, time $t_1$ 310, and time $t_2$ 312 can be used to construct the training example.

Figure 3B:
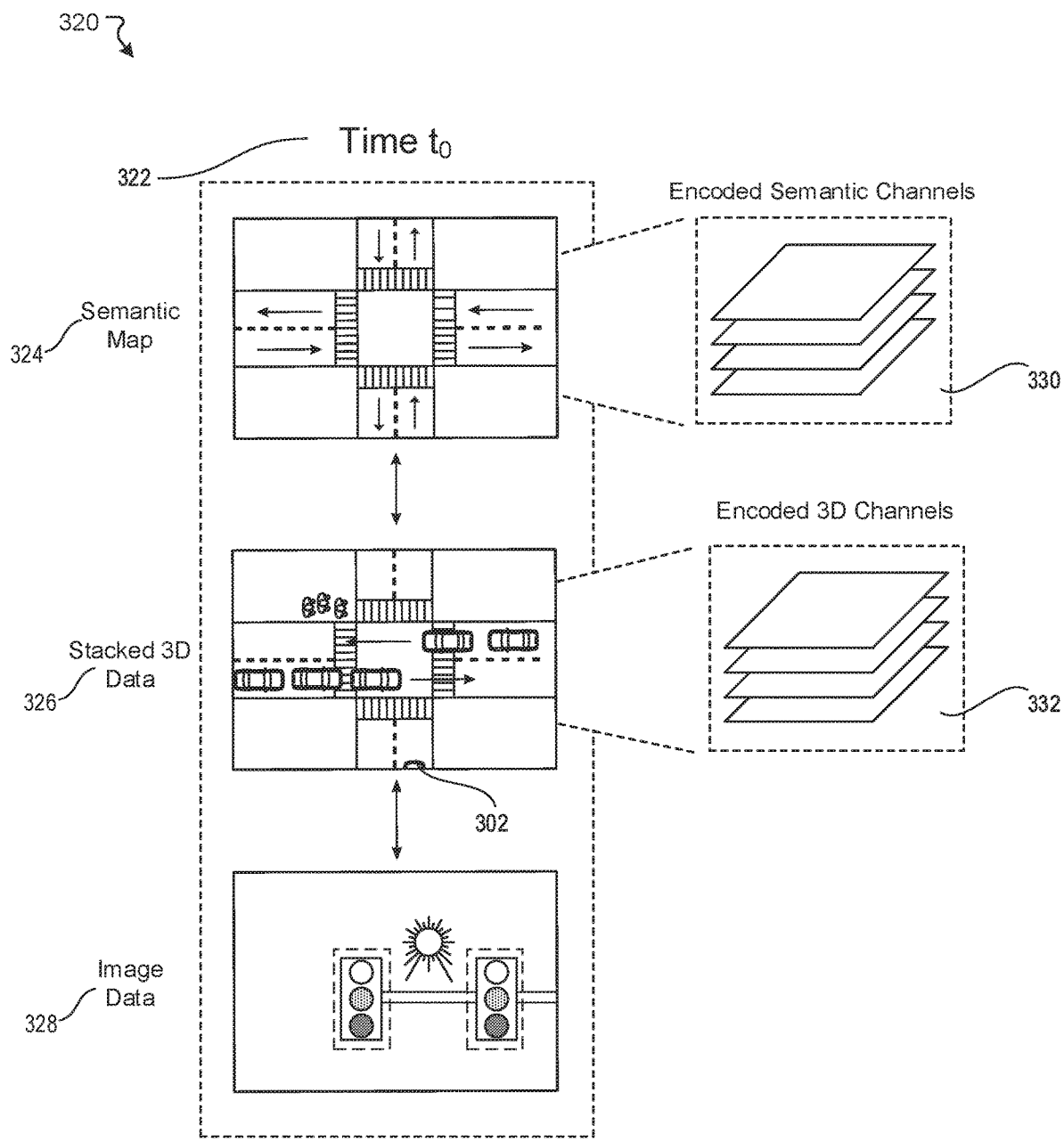
Figure 3C:
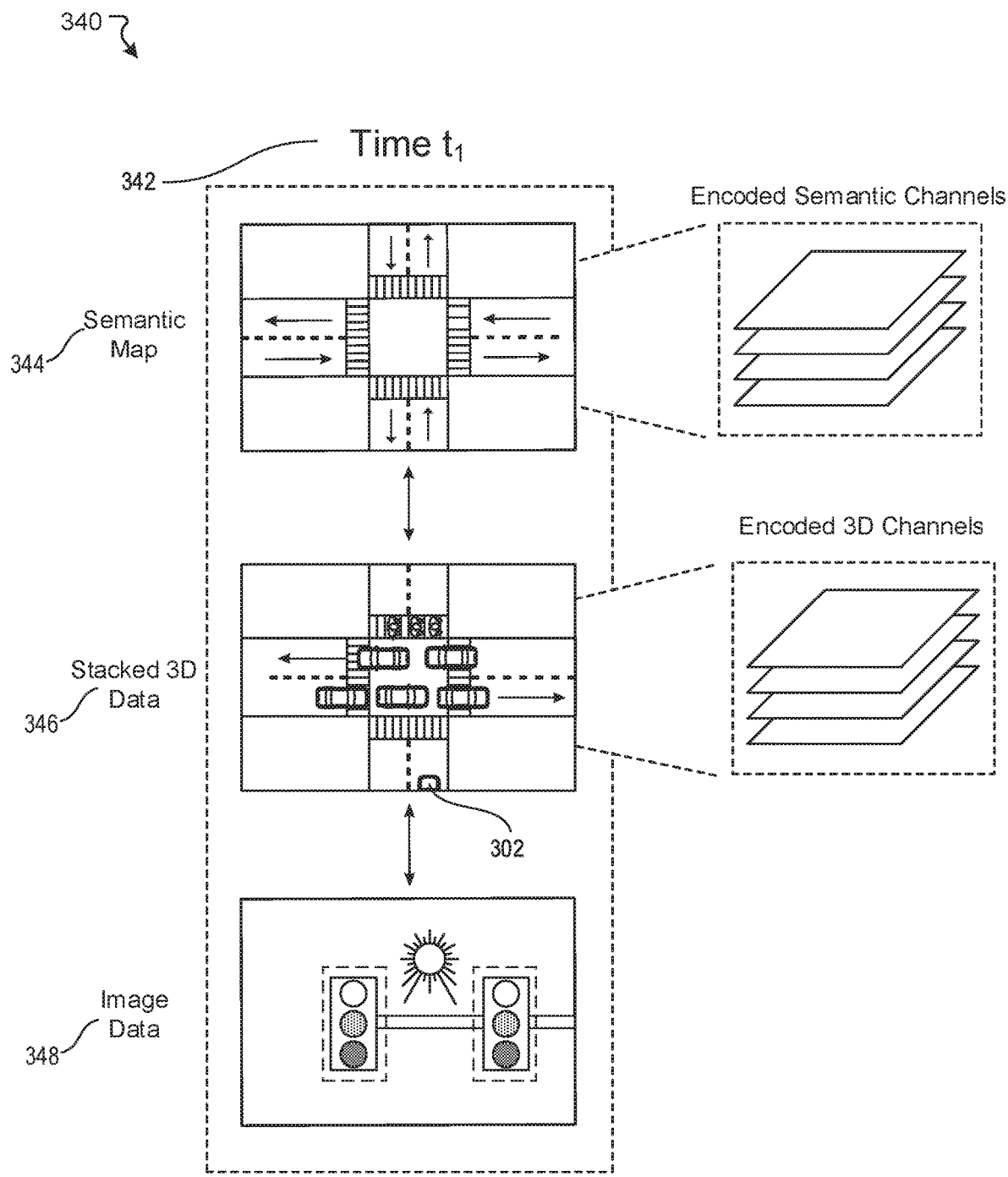
Figure 3D:
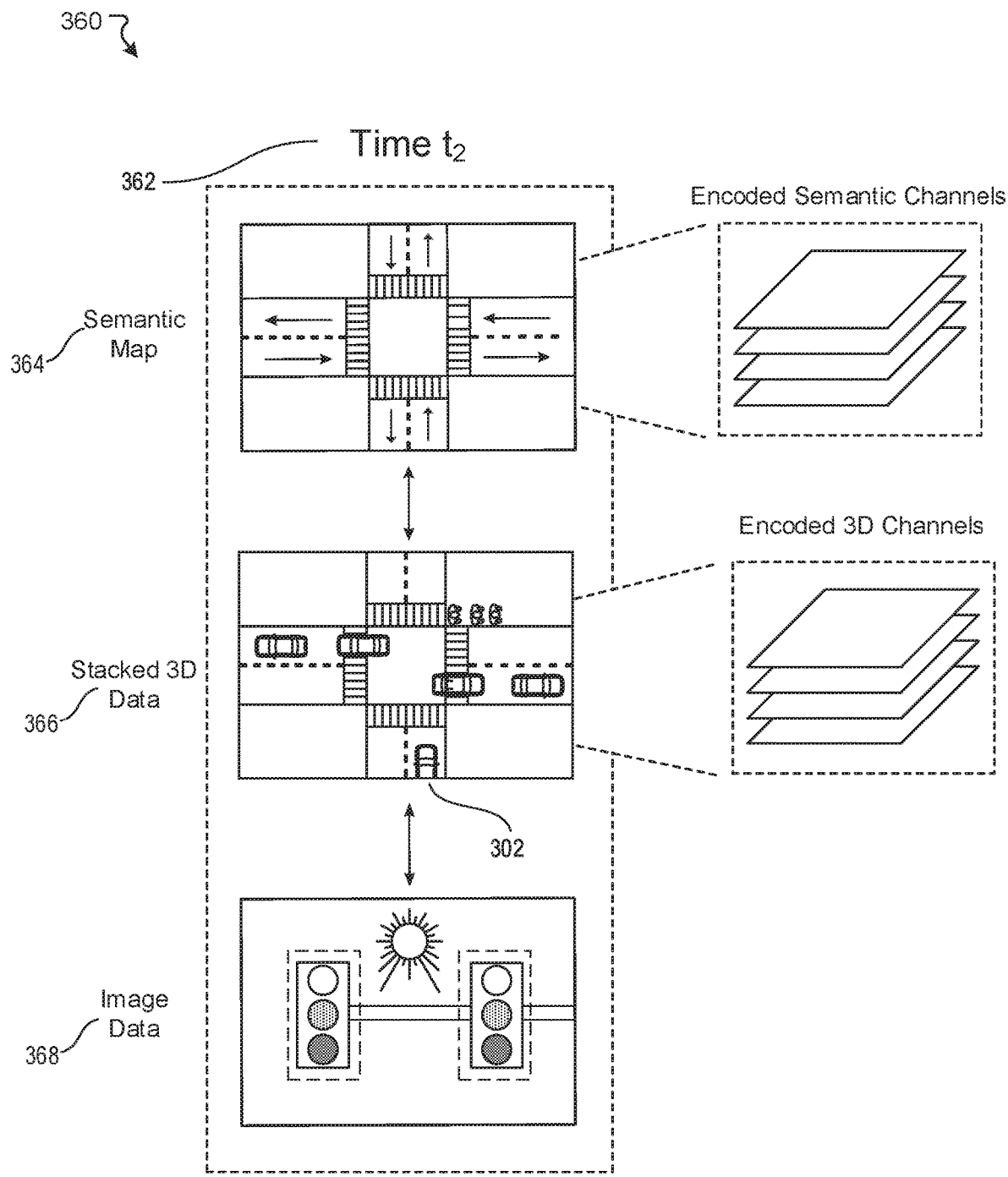

As mentioned, in some embodiments, the training example can include a plurality of sub-examples that represent data captured at some pre-defined time interval, as illustrated in the examples of FIGS. 3B-3D. For example, FIG. 3B illustrates an example 320 of a first sub-example 322 including data captured at time $t_0$ 308. In some embodiments, the first sub-example 322 can include a semantic map 324 describing the environment 300. For example, the semantic map 324 can identify locations of road features of the environment 300, such as traffic lights, lanes, crosswalks, and directions of travel. In some embodiments, such information can be encoded as channels 330 associated with the semantic map 324. For example, the semantic map 324 can be associated with a first channel that identifies locations of traffic lights, a second channel that identifies locations of lanes and directions of travel, and a third channel that identifies locations of cross-walks. For example, the first channel can be represented as a binary image where pixels corresponding to locations of traffic lights are labeled with a value of 1 while the remaining pixels of the binary image are labeled with a value of 0. Many variations are possible. In some embodiments, separate channels can be used to designate lanes based on their direction of travel. For example, one channel of the semantic map 324 can identify lanes having one direction of travel while a different channel can be identify lanes having a different direction of travel. The first sub-example 322 can also include three-dimensional data 326 describing the environment 300 at time $t_0$ 308. For example, the three-dimensional data 326 can be a top-down representation of the environment 300. In some embodiments, the three-dimensional data 326 can be encoded as channels 332. For example, the channels 332 can provide details describing different types of agents (e.g., vehicles, pedestrians, cyclists, etc.) that were detected within the environment 300. For example, the three-dimensional data 326 can be associated with a first channel that represents locations of vehicular traffic detected by the vehicle 302 and a second channel that represents locations of pedestrian traffic detected by the vehicle 302. For example, the first channel can be represented as a binary image where pixels corresponding to locations of vehicles are labeled with a value of 1 while the remaining pixels of the binary image are labeled with a value of 0. Similarly, the second channel can be represented as a binary image where pixels corresponding to locations of pedestrians are labeled with a value of 1 while the remaining pixels of the binary image are labeled with a value of 0. Other approaches for representing channels including use of different colors to represent different agents and/or features are contemplated. Again, many variations are possible. In some embodiments, ego information corresponding to the vehicle 302 can be encoded within the three-dimensional data 326. For example, the ego information can be interpreted to determine locations of objects within the environment 300 relative to the vehicle 302. The first sub-example 322 can also include image data 328 of the traffic lights 304 at time $t_0$ 308.

FIG. 3C illustrates an example 340 of a second sub-example 342 including data captured at time $t_1$ 310. In some embodiments, the second sub-example 342 can include a semantic map 344 describing the environment 300, three-dimensional data 346 captured at time $t_1$ 310, and image data 348 of the traffic lights 304 at time $t_1$ 310. The semantic map 344 and the three-dimensional data 346 can each be associated with a set of channels, as described above.

Further, FIG. 3D illustrates an example 360 of a third sub-example 362 including data captured at time $t_2$ 312. In some embodiments, the third sub-example 342 can include a semantic map 364 describing the environment 300, three-dimensional data 366 captured at time $t_2$ 312, and image data 368 of the traffic lights 304 at time $t_2$ 312. Similarly, the semantic map 364 and the three-dimensional data 366 can each be associated with a set of channels, as described above.

Figure 3E:
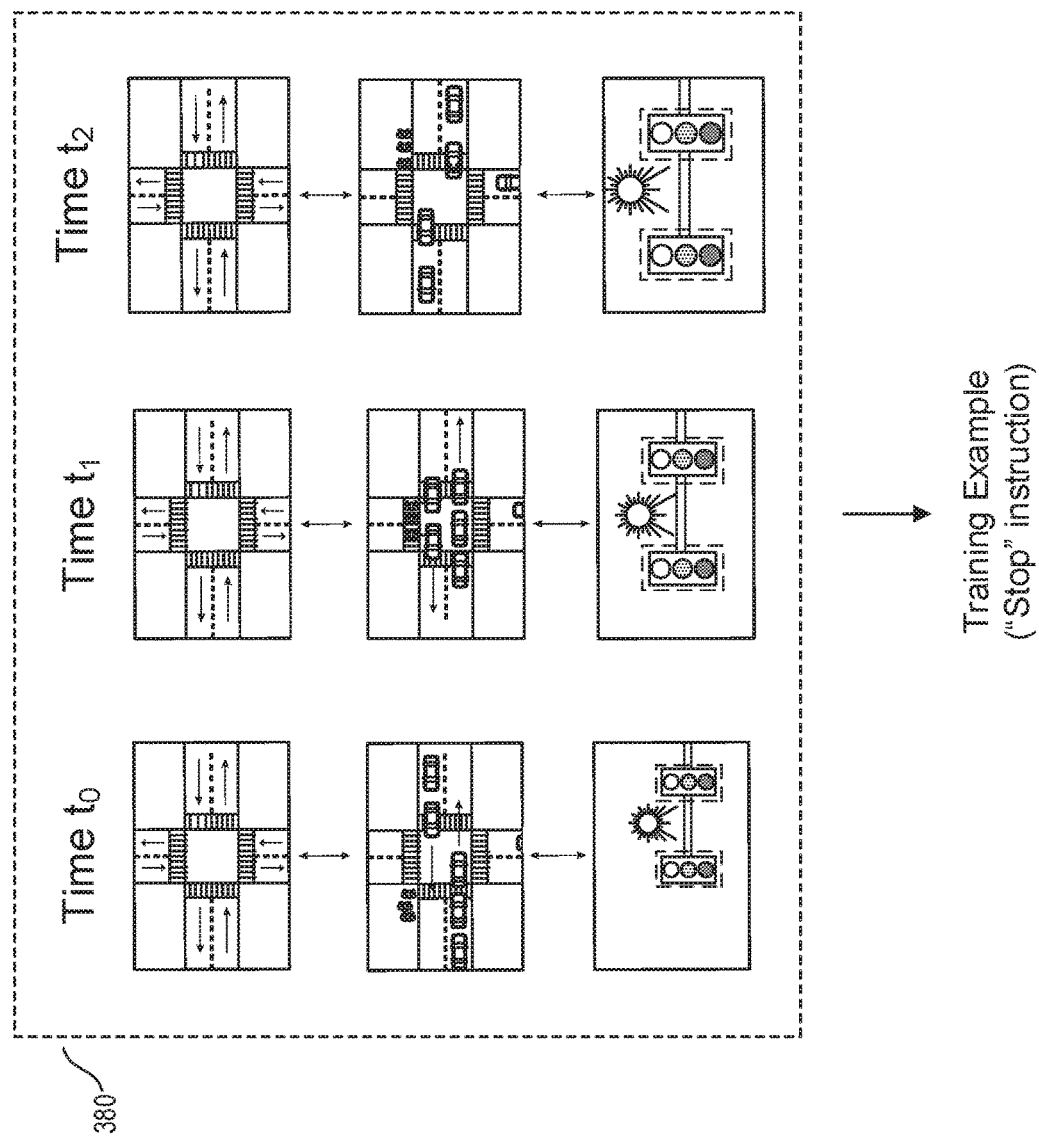

In various embodiments, the training module 206 can construct the training example from the first sub-example 322, the second sub-example 342, and the third sub-example 362, as illustrated in the example of FIG. 3E. The training module 206 can also be configured to label the training example 380. The labeled training example can then be used to train the model to predict traffic light states. In some embodiments, the training example 380 can be hand labeled by a human. In the example of FIG. 3E, the training example 380 has been labeled as an example in which a vehicle should have stopped driving upon detecting cross-traffic motion as represented by the three-dimensional data over time $t_0$ 308, time $t_1$ 310, and time $t_2$ 312. In some embodiments, the training module 206 can automatically label the training example 380 based on vehicle disengagement data. For example, the vehicle 302 may be a driver-assisted autonomous or semi-autonomous vehicle that is capable of navigating itself within the environment 300. The driver of the vehicle 302 can access controls to override autonomous or semi-autonomous operation of the vehicle 302 when the vehicle 302 performs an erroneous operation. Further, the vehicle 302 can also be capable of detecting traffic lights and their respective states based on a conventional image processing approach, as described above. In this example, the vehicle 302 can predict states of the traffic lights 304 to determine whether to proceed through the intersection. In general, if the vehicle 302 accurately predicts states of the traffic lights 304, then the driver of the vehicle 302 will allow the vehicle 302 to proceed through the intersection. However, if the vehicle 302 fails to accurately predict states of the traffic lights 304, then the driver of the vehicle 302 will disengage autonomous or semi-autonomous operation and assume manual control of the vehicle 302. In various embodiments, such disengagement data can be used to automatically label training examples. For example, if the vehicle 302 accurately predicted the traffic lights 304 to be green and proceeded through the intersection without the driver disengaging, then the training example 380 can be labeled as an example in which the vehicle 302 operated as intended. In contrast, if the vehicle 302 erroneously predicted the traffic lights 304 to be green and the driver assumed manual control of the vehicle 302, then the training example 380 can be labeled as an example in which the vehicle 302 did not operate as intended. Naturally, many variations are possible. For example, in some embodiments, a model (e.g., a machine learning model, deep neural network, etc.) for predicting traffic light states can be trained from examples that are generated from three-dimensional data and image data captured by vehicles over a set of time intervals. For example, the model can learn to predict traffic light states based on feature vectors derived from three-dimensional data of an environment and feature vectors derived from image data of one or more traffic lights within the environment. Such models can thus learn to leverage traffic motion in a temporal context to determine traffic light states.

Figure 3F:
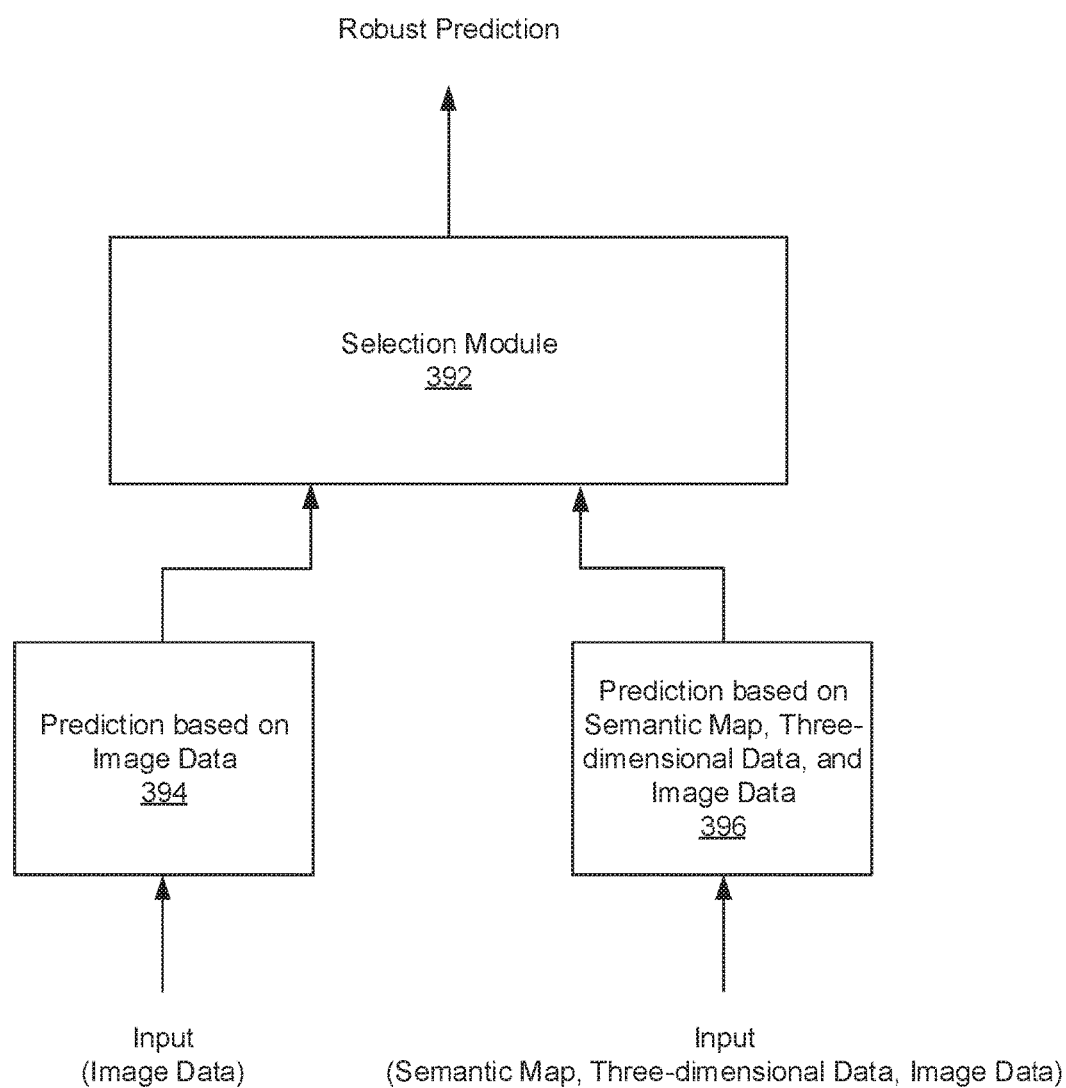

The prediction module 208 can be configured to apply the model trained by the training module 206 to predict traffic light states based on observed changes to traffic motion patterns over time. For example, in some embodiments, the prediction module 208 can provide a set of inputs to the model and, in response, the model can output a "stop" or "go" instruction. In some embodiments, a "stop" instruction can be associated with control commands that instruct one or more actuators associated with a vehicle to stop driving. In some embodiments, a "go" instruction can be associated with control commands that instruct one or more actuators associated with a vehicle to proceed driving. In some embodiments, instructions, such as a stop or go instruction, can be provided to the planning module 210, as described below. The set of inputs can include a semantic map of an environment, three-dimensional data of the environment as captured by a vehicle over a period of time, and image data representing traffic lights in the environment as captured by the vehicle over the period of time. As mentioned, in some embodiments, the model can be used in combination with conventional image processing techniques to further improve traffic light and state detection, as illustrated in the example diagram 390 of FIG. 3F. For example, a selection module 392 can improve traffic light state detection based on a data-driven evaluation of predictions outputted from a technique 394 that generates the predictions based on image data alone and predictions outputted from a technique 396 that was trained by the training module 206 to generate the predictions based on a semantic map, three-dimensional data, and image data, as described above. For example, the selection module 392 can bias toward predictions outputted by the technique 394 when environmental conditions permit reliable traffic light and state detection based on captured image data alone. In another example, the selection module 392 can bias toward predictions outputted by the technique 396 when environmental conditions do not permit reliable traffic light and state detection based on captured image data alone, such as poor weather conditions or camera obstructions. In this example, predictions outputted by the technique 396 can provide more accurate detection of traffic based on a combination of a semantic map, three-dimensional data, and image data. Many variations are possible. For example, in some embodiments, the selection model 392 can also receive as input an audio signal captured by one or more microphones of a vehicle over a period of time. In such embodiments, the selection model 392 can determine traffic light states while also considering changes to traffic motion patterns that may result from emergency vehicles that emit a siren.

The planning module 210 can be configured to plan trajectories for navigating a vehicle from a starting location to a destination location. The planning module 210 can therefore be tasked with many decisions that involve navigating the vehicle through various environments. In some embodiments, predictions generated by the prediction module 208 can be provided as inputs to the planning module 210. The planning module 210 can consider such predictions involving traffic light states and corresponding instructions when planning trajectories for the vehicle.

Figure 4:
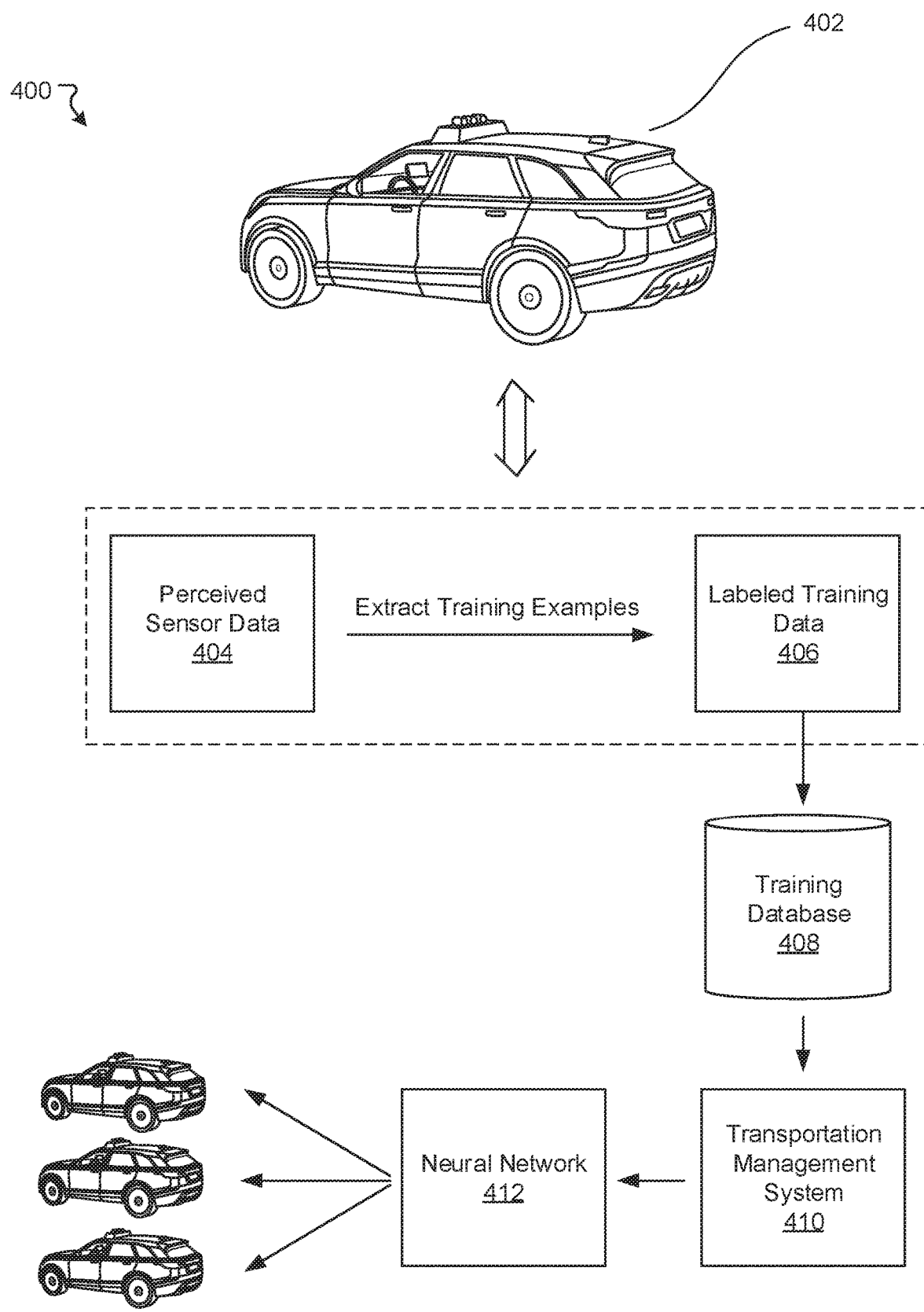
FIG. 4 illustrates an example diagram of an approach for training and distributing a machine learning model to interpret traffic light states, according to an embodiment of the present technology.
Figure 6:
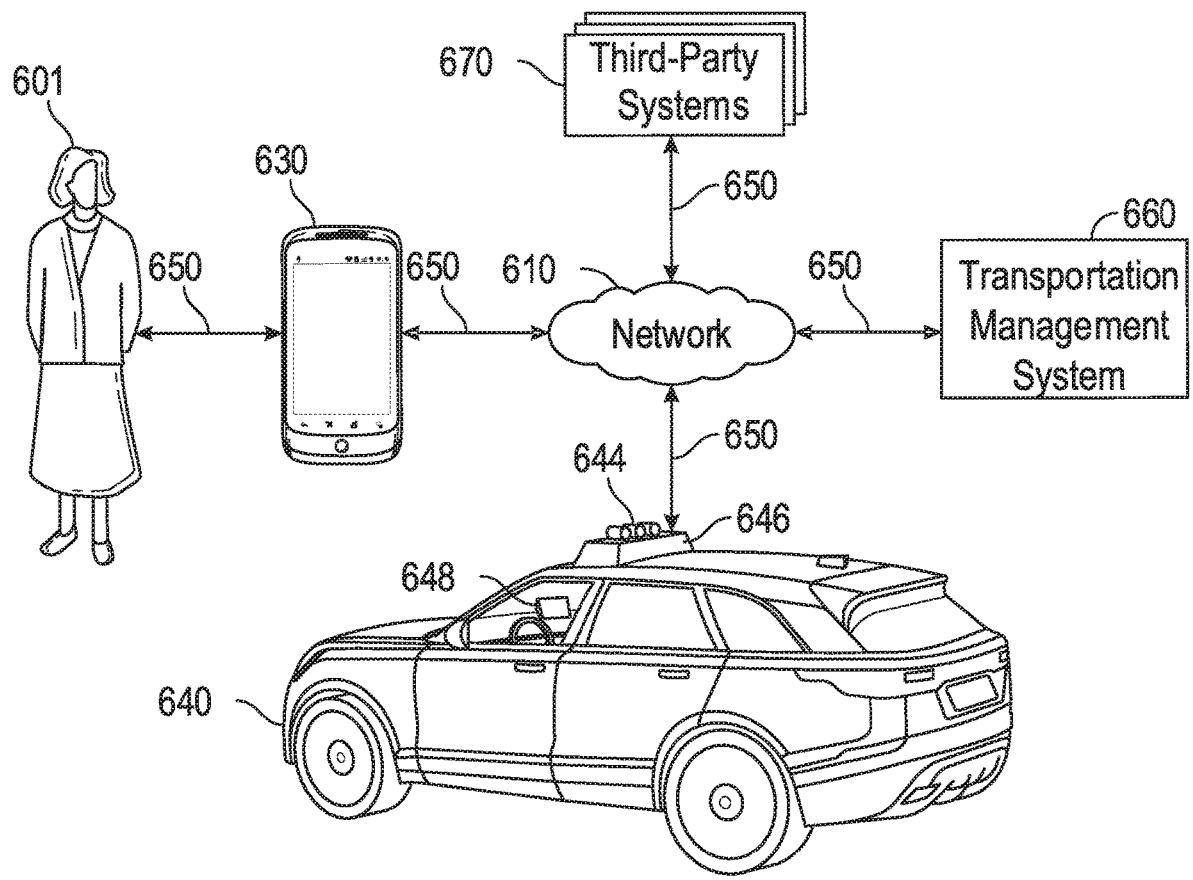
FIG. 6 illustrates an example block diagram of a transportation management environment, according to an embodiment of the present technology.

FIG. 4 illustrates an example diagram 400 of an approach for predicting traffic light states based on functionality of the traffic light interpretation module 202, according to an embodiment of the present technology. In this example, the approach can be implemented by a vehicle 402 that is included in a fleet of such vehicles that can capture sensor data of environments from which training examples can be extracted and used to train (and re-train) a model 412. The vehicle 402 can be, for example, the vehicle 640 as shown in FIG. 6. For example, at block 404, sensor data captured by sensors in the vehicle 402 while navigating an environment can be obtained. For example, the sensor data can include an encoded semantic map of the environment, three-dimensional data describing the environment over a set of time intervals, and image data of one or more traffic lights in the environment as captured by optical cameras of the vehicle 402 over the set of time intervals. At block 406, the sensor data can be used to generate and label training data for training the model 412 (e.g., deep neural network) to predict traffic light states based on observed changes to traffic motion patterns over time, as described above. In various embodiments, the training data can be accessed by a transportation management system 410 (e.g., the transportation management system 660 of FIG. 6). For example, the training data can be stored in a training database 408. In various embodiments, the stored training data can be used by the transportation management system 410 to train the model 412 to predict traffic light states, as described above. In some embodiments, the transportation management system 410 can distribute the trained model 412 to a fleet of vehicles that offer ridesharing and other services. Many variations are possible.

FIG. 5 illustrates an example method 500, according to an embodiment of the present technology. At block 502, sensor data captured by at least one sensor of a vehicle can be determined over a set of time intervals while navigating an environment. At block 504, three-dimensional data describing the environment over the set of time intervals can be determined from the captured sensor data. The three-dimensional data capturing a traffic motion pattern for at least one direction of travel. At block 506, image data of at least one traffic light in the environment can be determined over the set of time intervals from the captured sensor data. At block 508, a state of the at least one traffic light can be predicted based at least in part on the three-dimensional data describing the environment and the image data of at least one traffic light in the environment over the set of time intervals.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the traffic light interpretation module 202 may be implemented by one or more computing systems of the transportation management system 660. In some embodiments, some or all modules of the traffic light interpretation module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
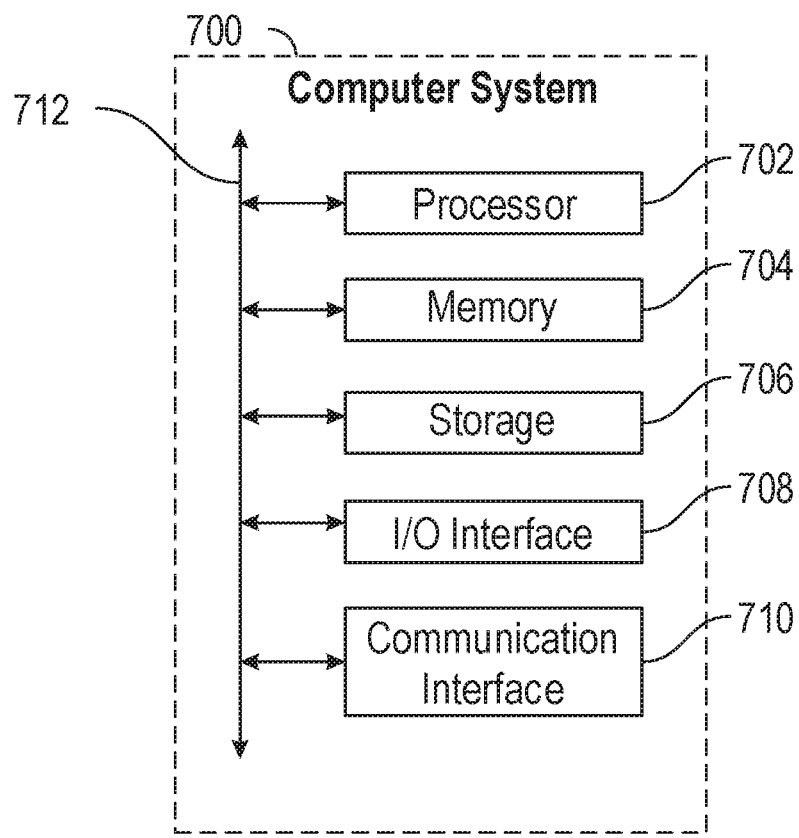
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    determining, by a computing system, sensor data of an environment captured by at least one sensor included on a vehicle over a set of time intervals while the vehicle navigates the environment;
    determining, by the computing system, three-dimensional data describing the environment over the set of time intervals from the sensor data, the three-dimensional data capturing a traffic motion pattern for at least two directions of travel;
    determining, by the computing system, image data of at least one traffic light in the environment over the set of time intervals from the sensor data; and
    predicting, by the computing system, a state of the at least one traffic light based at least in part on (i) the three-dimensional data capturing the traffic motion pattern for the at least two directions of travel as determined based on the sensor data and (ii) the image data of the at least one traffic light in the environment over the set of time intervals as determined based on the sensor data, wherein the state of the at least one traffic light is predicted based on a relationship between the traffic motion pattern for the at least two directions of travel and at least one lane that is governed by the at least one traffic light.

2. The computer-implemented method of claim 1, wherein predicting the state of the at least one traffic light further comprises:
    determining, by the computing system, the at least one lane that is governed by the at least one traffic light based on a semantic map of the environment.

3. The computer-implemented method of claim 2, wherein the semantic map encodes locations of a particular type of road feature detected within the environment.

4. The computer-implemented method of claim 3, wherein the semantic map identifies locations of traffic lights, locations of lanes and directions of travel, or locations of cross-walks and directions of travel.

5. The computer-implemented method of claim 1, wherein the three-dimensional data is derived from point clouds captured by at least one of a LiDAR system included on the vehicle over the set of time intervals, radar data captured by a radar system included on the vehicle over the set of time intervals, image data captured by a camera system included on the vehicle, or a combination thereof.

6. The computer-implemented method of claim 1, wherein the three-dimensional data is associated with encoded information including locations of a particular type of agent detected within the environment, and wherein the traffic motion pattern for the at least two directions of travel is determined based at least in part on the locations of the particular type of agent detected within the environment.

7. The computer-implemented method of claim 6, wherein the encoded information includes locations of vehicles detected within the environment and locations of pedestrians detected within the environment.

8. The computer-implemented method of claim 1, wherein the image data of the at least one traffic light that governs the at least one lane in the environment over the set of time intervals is captured by one or more optical cameras associated with the vehicle from the sensor data.

9. The computer-implemented method of claim 1, wherein predicting the state of the at least one traffic light further comprises:
    providing, by the computing system, an instruction to the vehicle, wherein the instruction causes the vehicle to stop driving or proceed driving.

10. The computer-implemented method of claim 1, wherein the prediction for the state of the at least one traffic light is further based in part on a state prediction determined for the at least one traffic light based on an image processing technique that predicts the state for the at least one traffic light based on a color perceived in association with the at least one traffic light in at least one image.

11. The computer-implemented method of claim 1, wherein the traffic motion pattern for the at least two directions of travel is associated with an intersection, and wherein the state of the at least one traffic light is predicted based at least in part on the traffic motion pattern for the at least two directions of travel associated with the intersection.

12. A system comprising:
    at least one processor; and
    a memory storing instructions that, when executed by the at least one processor, cause the system to perform:
    determining sensor data of an environment captured by at least one sensor included on a vehicle over a set of time intervals while the vehicle navigates the environment;
    determining three-dimensional data describing the environment over the set of time intervals from the sensor data, the three-dimensional data capturing a traffic motion pattern for at least two directions of travel;
    determining image data of at least one traffic light in the environment over the set of time intervals from the sensor data; and
    predicting a state of the at least one traffic light based at least in part on (i) the three-dimensional data capturing the traffic motion pattern for the at least two directions of travel as determined based on the sensor data and (ii) the image data of the at least one traffic light in the environment over the set of time intervals as determined based on the sensor data, wherein the state of the at least one traffic light is predicted based on a relationship between the traffic motion pattern for the at least two directions of travel and at least one lane that is governed by the at least one traffic light.

13. The system of claim 12, wherein predicting the state of the at least one traffic light further causes the system to perform:
   determining the at least one lane that is governed by the at least one traffic light based on a semantic map of the environment.

14. The system of claim 13, wherein the semantic map encodes locations of a particular type of road feature detected within the environment.

15. The system of claim 14, wherein the semantic map identifies locations of traffic lights, locations of lanes and directions of travel, or locations of cross-walks and directions of travel.

16. The system of claim 12, wherein the three-dimensional data is derived from point clouds captured by at least one of a LiDAR system included on the vehicle over the set of time intervals, radar data captured by a radar system included on the vehicle over the set of time intervals, image data captured by a camera system included on the vehicle, or a combination thereof.

17. A non-transitory computer-readable storage medium including instructions that, when executed by at least one processor of a computing system, cause the computing system to perform:
   determining sensor data of an environment captured by at least one sensor included on a vehicle over a set of time intervals while the vehicle navigates the environment;
   determining three-dimensional data describing the environment over the set of time intervals from the sensor data, the three-dimensional data capturing a traffic motion pattern for at least two directions of travel;
   determining image data of at least one traffic light in the environment over the set of time intervals from the sensor data; and
   predicting a state of the at least one traffic light based at least in part on (i) the three-dimensional data capturing the traffic motion pattern for the at least two directions of travel as determined based on the sensor data and (ii) the image data of the at least one traffic light in the environment over the set of time intervals as determined based on the sensor data, wherein the state of the at least one traffic light is predicted based on a relationship between the traffic motion pattern for the at least two directions of travel and at least one lane that is governed by the at least one traffic light.

18. The non-transitory computer-readable storage medium of claim 17, wherein predicting the state of the at least one traffic light further causes the computing system to perform:
   determining the at least one lane that is governed by the at least one traffic light based on a semantic map of the environment.

19. The non-transitory computer-readable storage medium of claim 18, wherein the semantic map encodes locations of a particular type of road feature detected within the environment.

20. The non-transitory computer-readable storage medium of claim 19, wherein the semantic map identifies locations of traffic lights, locations of lanes and directions of travel, or locations of cross-walks and directions of travel.

21. The non-transitory computer-readable storage medium of claim 17, wherein the three-dimensional data is derived from point clouds captured by at least one of a LiDAR system included on the vehicle over the set of time intervals, radar data captured by a radar system included on the vehicle over the set of time intervals, image data captured by a camera system included on the vehicle, or a combination thereof.

* * * * *